(12) United States Patent
Lee et al.

(10) Patent No.: US 8,620,476 B2
(45) Date of Patent: Dec. 31, 2013

(54) METHOD AND APPARATUS FOR SMART CLIMATE CONTROL

(75) Inventors: Leesa Lee, Sausalito, CA (US); Ilen Zazueta-Hall, Sebastopol, CA (US); Magnus Asbo, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 387 days.

(21) Appl. No.: 13/023,347

(22) Filed: Feb. 8, 2011

(65) Prior Publication Data

US 2011/0202181 A1 Aug. 18, 2011

Related U.S. Application Data

(60) Provisional application No. 61/337,999, filed on Feb. 12, 2010.

(51) Int. Cl.
*G01M 1/38* (2006.01)
*G05B 13/00* (2006.01)
*G05B 15/00* (2006.01)
*G05D 23/00* (2006.01)

(52) U.S. Cl.
USPC .................. 700/276; 700/277; 700/278

(58) Field of Classification Search
USPC ............... 700/65–66, 276–278, 299–300
See application file for complete search history.

(56) References Cited

U.S. PATENT DOCUMENTS

| | | | |
|---|---|---|---|
| 5,706,207 A * | 1/1998 | Kurten et al. ................. | 700/286 |
| 5,924,486 A | 7/1999 | Ehlers et al. | |
| 6,571,152 B1 * | 5/2003 | Sawa et al. .................... | 700/286 |
| 6,580,950 B1 | 6/2003 | Johnson et al. | |
| 6,639,331 B2 * | 10/2003 | Schultz .......................... | 307/84 |
| 6,975,958 B2 | 12/2005 | Bohrer et al. | |
| 7,142,948 B2 | 11/2006 | Metz | |
| 7,159,789 B2 | 1/2007 | Schwendinger et al. | |
| 7,159,790 B2 | 1/2007 | Schwendinger et al. | |
| 7,222,800 B2 * | 5/2007 | Wruck ........................... | 236/51 |
| 7,315,769 B2 * | 1/2008 | Balan et al. ................... | 700/286 |
| 7,372,173 B2 * | 5/2008 | Lutze et al. .................... | 290/44 |
| 7,476,988 B2 | 1/2009 | Mulhouse et al. | |
| 7,584,899 B2 | 9/2009 | dePauw et al. | |
| 7,634,504 B2 | 12/2009 | Amundson | |
| 7,668,532 B2 * | 2/2010 | Shamoon et al. ............. | 455/410 |
| 7,834,479 B2 * | 11/2010 | Capp et al. .................... | 307/21 |
| 7,941,530 B2 * | 5/2011 | Ha et al. ........................ | 709/224 |
| 7,949,435 B2 * | 5/2011 | Pollack et al. ................ | 700/291 |

(Continued)

FOREIGN PATENT DOCUMENTS

| | | |
|---|---|---|
| JP | 2004-101048 A | 4/2004 |
| KR | 10-2008-0044515 A | 5/2008 |

OTHER PUBLICATIONS

International Search Report and Written Opinion mailed Oct. 25, 2011 for PCT Application No. PCT/US2011/024346.

(Continued)

*Primary Examiner* — Ramesh Patel
(74) *Attorney, Agent, or Firm* — Moser Taboada (57) ABSTRACT

A method and apparatus for controlling climate within a building. In one embodiment, the apparatus comprises a smart climate unit for (i) obtaining distributed generator (DG) information pertaining to operation of a DG that generates power for the building, and (ii) controlling at least one climate condition within the building based on at least one of the DG information, local input, or remote input.

20 Claims, 5 Drawing Sheets

(56) References Cited

U.S. PATENT DOCUMENTS

| | | | |
|---|---|---|---|
| 8,046,110 B2* | 10/2011 | Mayor et al. | 700/297 |
| 8,219,259 B2* | 7/2012 | Haugh | 700/295 |
| 8,260,468 B2* | 9/2012 | Ippolito et al. | 700/286 |
| 8,340,832 B1* | 12/2012 | Nacke et al. | 700/295 |
| 2004/0267408 A1 | 12/2004 | Kramer | |
| 2005/0034023 A1* | 2/2005 | Maturana et al. | 714/37 |
| 2005/0040247 A1* | 2/2005 | Pouchak | 236/44 C |
| 2007/0249319 A1* | 10/2007 | Faulkner et al. | 455/402 |
| 2008/0243687 A1* | 10/2008 | Johnson et al. | 705/40 |
| 2008/0272934 A1* | 11/2008 | Wang et al. | 340/870.11 |
| 2009/0055030 A1* | 2/2009 | Mayor et al. | 700/287 |
| 2009/0138099 A1* | 5/2009 | Veillette | 700/22 |
| 2009/0157529 A1* | 6/2009 | Ehlers et al. | 705/26 |
| 2009/0195349 A1* | 8/2009 | Frader-Thompson et al. | 340/3.1 |
| 2010/0023337 A1* | 1/2010 | Case | 705/1 |
| 2010/0034386 A1* | 2/2010 | Choong et al. | 380/270 |
| 2010/0156665 A1* | 6/2010 | Krzyzanowski et al. | 340/870.02 |
| 2010/0261465 A1* | 10/2010 | Rhoads et al. | 455/420 |
| 2010/0289643 A1* | 11/2010 | Trundle et al. | 340/545.1 |
| 2011/0022242 A1* | 1/2011 | Bukhin et al. | 700/291 |
| 2011/0231020 A1* | 9/2011 | Ramachandran et al. | 700/278 |

OTHER PUBLICATIONS

"HAI OmniTouch 5.7", Five pages downloaded on May 9, 2011 from website: http://www.homeauto.com/Products/ConsolesTouchscreens/Omnitouch.asp.

"Join the SmartAC™ Program", Demand Response Fact Sheet, Two pages downloaded on May 9, 2011 from website: http://www.pge.com/includes/docs/pdfs/myhome/saveenergymoney/energysavinqprograms/smartac/fs_smartac_residential.pdf.

"The Ecobee Smart Thermostat", Three pages downloaded on May 9, 2011 from website: http://www.ecobee.com/product/smart-overview/.

* cited by examiner

METHOD AND APPARATUS FOR SMART CLIMATE CONTROL

CROSS-REFERENCE TO RELATED APPLICATIONS

This application claims benefit of U.S. provisional patent application Ser. No. 61/337,999, filed Feb. 12, 2010, which is herein incorporated in its entirety by reference.

BACKGROUND OF THE INVENTION

1. Field of the Invention

Embodiments of the present disclosure relate generally to climate control within a building, and, in particular, smart climate control within the building.

2. Description of the Related Art

Current worldwide growth in demand for energy is leading to a durable increase in energy usage and a rapid depletion of existing fossil fuels to supply the required energy. Many of today's energy users are in search of ways to utilize energy more efficiently and limit their overall energy consumption. In some cases, energy users may employ distributed generators (DGs) for harvesting power from renewable energy sources, such as solar, wind, hydro, or the like, in order to offset their usage of energy derived from fossil fuels.

For many energy users, climate control within residential and commercial buildings, i.e., heating, air conditioning, humidity control, and the like, represents one of the largest areas of energy consumption. Given that many buildings are unoccupied over extended periods of time, such as during daytime hours when homeowners are away from their homes or evening hours when workers are away from their businesses, appropriately managing the climate within a building during such times provides an opportunity to reduce energy consumption.

Therefore, there is a need in the art for a method and apparatus for efficiently controlling a climate within a building.

SUMMARY OF THE INVENTION

Embodiments of the present invention generally relate to a method and apparatus for controlling climate within a building. In one embodiment, the apparatus comprises a smart climate unit for (i) obtaining distributed generator (DG) information pertaining to operation of a DG that generates power for the building, and (ii) controlling at least one climate condition within the building based on at least one of the DG information, local input, or remote input.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
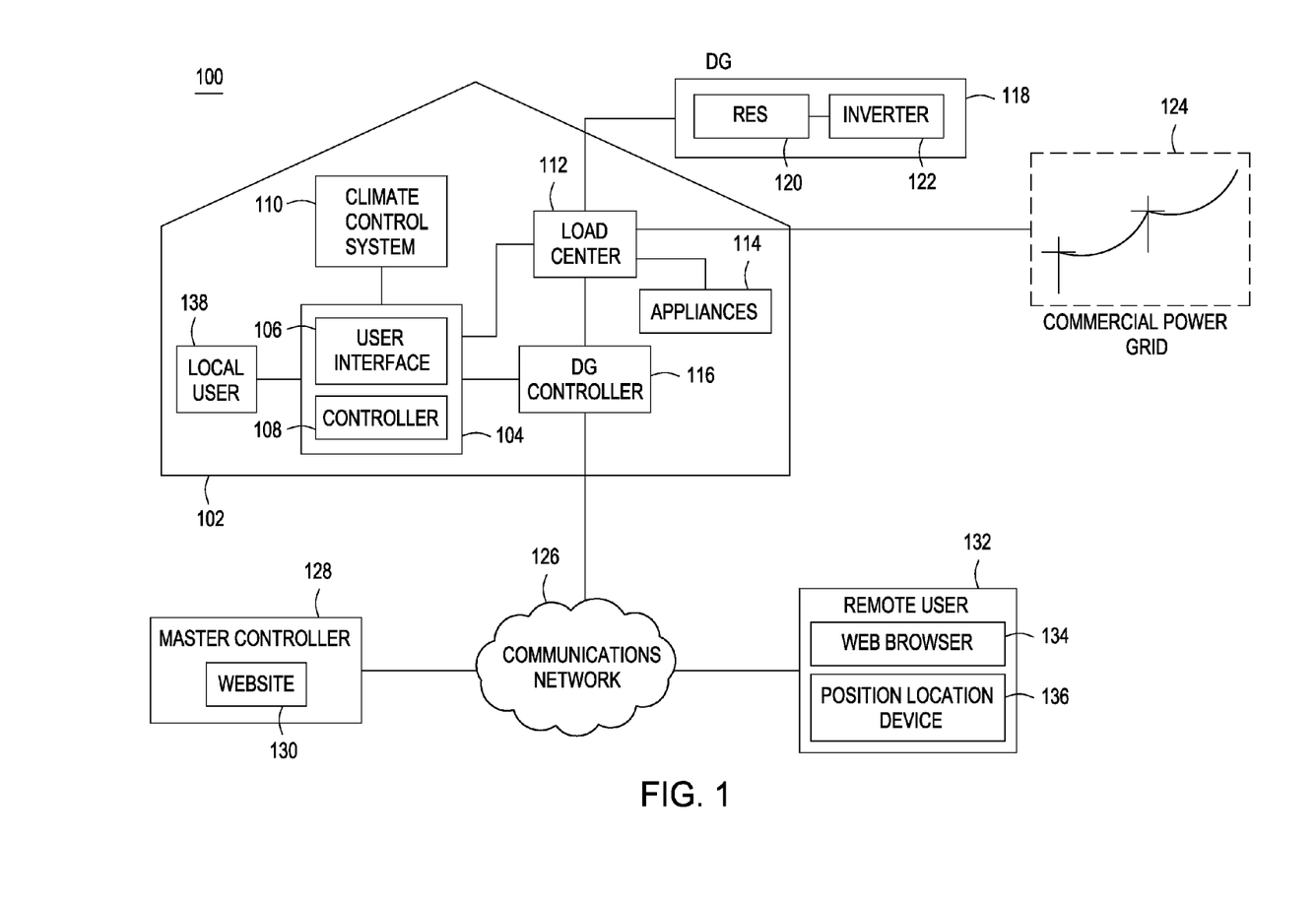
FIG. 1 is a block diagram of a system employing smart climate control in accordance with one or more embodiments of the present invention.

FIG. 1 is a block diagram of a system 100 employing smart climate control in accordance with one or more embodiments of the present invention. This diagram only portrays one variation of the myriad of possible system configurations. The present invention can function in a variety of environments and systems.

The system 100 comprises a building 102, such as a residential or commercial building, coupled to a distributed generator (DG) 118 and a commercial power grid 124. The building 102 comprises a smart climate unit 104, a climate control system 110, a load center 112, one or more appliances 114, and a DG controller 116. The commercial power grid 124 is coupled to the appliances 114 via the load center 112 for providing power to the appliances 114.

The DG system 119 comprises a renewable energy source (RES) 120 coupled to an inverter 122. The RES 120 may be any type of system for generating DC power from a renewable form of energy, such as wind, solar, hydro, and the like. The inverter 122 converts the generated DC power to AC power that is commercial power grid compliant and couples the AC power to the load center 112. The generated AC power may be further coupled from the load center 112 to the one or more appliances 114 and/or to the commercial power grid 124. Additionally or alternatively, generated energy may be stored for later use; for example, the generated energy may be stored utilizing batteries, heated water, hydro pumping, $H_2O$-to-hydrogen conversion, or the like.

In some embodiments, the inverter 122 may be a plurality of inverters utilized to convert the DC power from the RES 120 to AC power; for example, the RES 120 may comprise a plurality of photovoltaic (PV) modules where each PV module is coupled to an inverter in a one-to-one correspondence. Additionally, one or more DC/DC converters may be utilized within the DG 118, for example, coupled between the RES 120 and the inverter 122.

The DG controller 116 is coupled to the load center 112 and provides operational control of the DG 118 via the inverter 122. In some embodiments, the DG controller 116 provides such control utilizing power line communication (PLC) to communicate with the DG 118; additionally or alternatively, the DG controller 116 may utilize other types of wired and/or wireless techniques for communicating with the DG 118. The DG controller 116 is further communicatively coupled to a master controller 128 via a communications network 126 (e.g., the Internet) for sending information to/receiving information from the master control 128 pertaining to the operation of the DG 118. The DG controller 116 may utilize wired and/or wireless techniques for coupling to the communications network 126; in some embodiments, the DG controller 116 may be coupled to the communications network 126 via a commercially available router.

In accordance with one or more embodiments of the present invention, the smart climate unit 104 is coupled to the climate control system 110 for driving the climate control system 110 to control the climate (heating, cooling, humidity, heat pump activity, and the like) within the building 102. The smart climate unit 104 provides status displays (e.g., current temperature, humidity level, settings, and the like) and user-controls locally and remotely to allow both local and remote users to gauge current climate conditions and settings and make adjustments as needed. Additionally, the smart climate unit 104 provides location-based control of the climate control system 110 (i.e., control of the climate control system 110 based on the locations of one or more users). The smart climate unit 104 is further coupled to the DG controller 116 for obtaining information related to the operation of the DG 118 (e.g., power production information). The smart climate unit 104 may then utilize such DG information to control the climate within the building 102.

The smart climate unit 104 may be wall mounted or positioned on a desk, table, or the like, and comprises a user interface 106 and a smart climate unit controller 108. The controller 108 provides local control of the smart climate unit 104 via the user interface 106. In some embodiments, the smart climate unit 104 may comprise an available (i.e., "off the shelf") thermostat device which, for example, comprises components such as a microprocessor and memory, and is suitably modified in accordance with the invention described herein.

The user interface 106 provides display capabilities (e.g., to display current status, settings, time of use rates, or the like) and user controls for operatively controlling the smart climate unit 104, for example, by touch screen, buttons, knobs, or the like. Additionally or alternatively, the smart climate unit 104 may be directly coupled to a display and/or an input/output device, such as a personal computer, personal digital assistant, or the like, for providing the user interface 106. In such embodiments, the smart climate unit 104 may be coupled to the device by wired techniques or wireless techniques, for example utilizing standards such as IEEE 802.11, Zigbee, Z-Wave, or the like.

The user interface 106 allows a local user 138 to configure the smart climate unit 104 for initial use and to manually change current settings of the smart climate unit 104 (e.g., increase current temperature, decrease current humidity, or the like). Additionally, the local user 138 may, via the user interface 106, generate and/or change one or more climate control profiles utilized by the smart climate unit 104 for operating the climate control system 110. Such climate control profiles may specify climate control parameters (e.g., preferred temperature, humidity, heat pump settings, and the like) based on criteria such as time, energy mode, user preference, user location, weather conditions, and the like. For example, time-based climate control profiles may specify settings that are based on time of day, day of week, month of year, groupings of certain hours and/or days (e.g., waking/sleeping time, working from home, pet-sitting, vacation periods, holidays), and the like. Energy mode-based climate control profiles may specify settings that are based on criteria related to energy usage, such as energy saver mode, time of use (TOU) rates, current energy consumption, supply conditions (e.g., energy production by the DG 118), peak energy consumption times, and the like. User preference-based climate control profiles may specify preferred settings for one or more users. Location-based climate control profiles may specify settings that are based on proximity of one or more users and/or current travel speed of the one or more users. Weather-based profiles may specify settings that are based on current and/or predicted weather conditions. The smart climate unit 104 may provide a "wizard" function for assisting the local user 138 to initially configure, program, and/or operate the smart climate unit 104.

In addition to providing the local control functionality described above, the controller 108 provides remote control of the smart climate unit 104, allowing a remote user 132 to remotely obtain analogous displays and control for the smart climate unit 104. The smart climate unit controller 108 is communicatively coupled to the communications network 126 such that the remote user 132 may utilize a conventional web browser 134 to remotely access and operate the smart climate unit 104. For example, the remote user 132 may access a website 130 supported by the master controller 128 (or a server having access to the master controller 128) to access the smart climate unit 104 via a password protected portal. The remote user 132 may then execute control of the smart climate unit 104 as if the remote user 132 were local to the smart climate unit 104. For example, the remote user 132 may perform initial configuration of the smart control unit 104 (e.g., utilizing the "wizard"), change current settings of the smart climate unit 104, create new or change existing climate control profiles for the smart climate unit 104, or similarly operate the smart climate unit 104. The remote user 132 may access the smart climate unit 104 in such a manner utilizing any suitable device that provides the web browser 134, such as a smart cell phone, a personal digital assistant, a personal computer, or the like. Additionally, the website 130 may support a plurality of smart climate units 104 deployed within other areas of the building 102 (e.g., different floors) or other buildings.

The smart climate unit controller 108 further provides location-based climate control for the building 102 based on a location of one or more users. For example, the controller 108 may provide climate control for the building 102 based on a location of the remote user 132. In some embodiments, the smart climate unit controller 108 utilizes a position location device 136 as a proxy for determining a location of the remote user 132 and operating the climate control system 110 based on the determined location. The position location device 136 may be any device for locating people and/or assets, e.g., a cell phone, a global positioning system (GPS), a personal digital assistant, ON-STAR service, or the like. For example, the smart climate unit controller 108 may determine the location of the remote user's cell phone utilizing a global positioning satellite (GPS) receiver of the cell phone, cell-triangulation features of the cell phone, or the like. The smart climate unit controller 108 may then drive the climate control system 110 to suitably adjust the temperature and/or humidity within the building 102 based on the determined location of the remote user 132. For example, the smart climate unit controller 108 may leverage existing site information, such as an address of the building 102, to control the climate control system 110 based on the remote user's proximity to the building 102 as well as speed of approaching the building 102.

In order to determine appropriate climate settings for the building 102 based on the location of the remote user 132, the smart climate unit controller 108 may maintain one or more location-based climate control profiles associated with the remote user 132. For example, the location-based climate control profiles may specify that air conditioning be turned on when the remote user 132 (i.e., utilizing the position location device 136 as a user-proxy) is within a predefined distance of the building 102, that a certain temperature and/or humidity level be maintained when the remote user 132 is within the building 102, or the like. The smart climate unit controller 108 may additionally factor in travel speed of the remote user 132 in addition to the remote user's distance from the building 102 for suitably operating the climate control system 110. The smart climate unit controller 108 may also maintain location-based climate control profiles for additional users (such as the local user 138) and/or groups of users (such as a family group), utilizing corresponding cell phones/other wireless portable devices as proxies for the additional users. The smart climate unit 104 may utilize the location of each user at a particular time to affect settings. For example, if a wife is home alone, her personal climate control profile will prevail, while if one or more family members are home, a "family" climate control profile will prevail.

In addition to providing local and remote programming capabilities, the smart climate unit 104 also provides climate and/or energy consumption data, statistics, and/or reports both locally and remotely. For example, the smart climate unit 104 may provide reports of climate control statistics during pre-defined or user-defined periods (e.g., total hours cooling, total hours heating, or the like) and/or energy related statistics (e.g., energy saver mode hours, energy consumption for cooling, energy consumption for heating, or the like). Such data, statistics, and/or reports may be displayed via the user interface 106 and/or the web browser 134, for example, as bar charts, pie charts, in spreadsheet format, or the like, as well as stored for future use. In some embodiments, the smart climate unit 104 may be coupled to a local printer for printing out desired reports/statistics and/or may allow for downloading of report data in various formats, such as Comma Separated Values (CSV) format, for further analysis.

In some embodiments, the smart climate unit 104 may regulate energy consumption utilizing demand management. For example, based upon supply conditions, such as energy production by the DG 118, peak energy consumption times, time of use (TOU) rates, or the like, the smart climate unit 104 may optimally control the climate control system 110 for achieving a desired level of energy consumption (e.g., optimizing energy consumption versus cost), as well as control consumption decisions, energy storage decisions, or the like. Further, the smart climate unit 104 may additionally or alternatively control the climate control system 110 based on externally generated requests to regulate energy consumption. For example, the smart climate unit 104 may receive a request from an electric company (e.g., communicated via the powerline or the communications network 126) to regulate energy consumption in order to assist with peak load balancing; the smart climate unit 104 may then control the climate control system 110 accordingly. Additionally, the smart climate unit 104 may access current and/or predicted weather-related information, for example at weather websites via the communications network 126, and/or comprise weather-related sensors, and utilize such information for controlling the climate control system 110. For example, the smart climate unit 104 may evaluate potential power generation by the DG 118 based on current and/or predicted weather conditions and factor such information into establishing settings for the climate control system 110. The smart climate unit 104 may further utilize weather-related information to "learn" timeframes for adjusting temperature and/or humidity within the building 102, for example, based on external weather conditions. The smart climate unit 104 may then factor in the learned timeframes when operating the climate control system 110, for example, during application of any of the climate control profiles.

In some alternative embodiments, the appliances 114 may comprise one or more "smart" appliances that are controlled by the smart climate unit 104, for example, based on energy consumption, TOU rates, user proximity, or the like.

Figure 2:
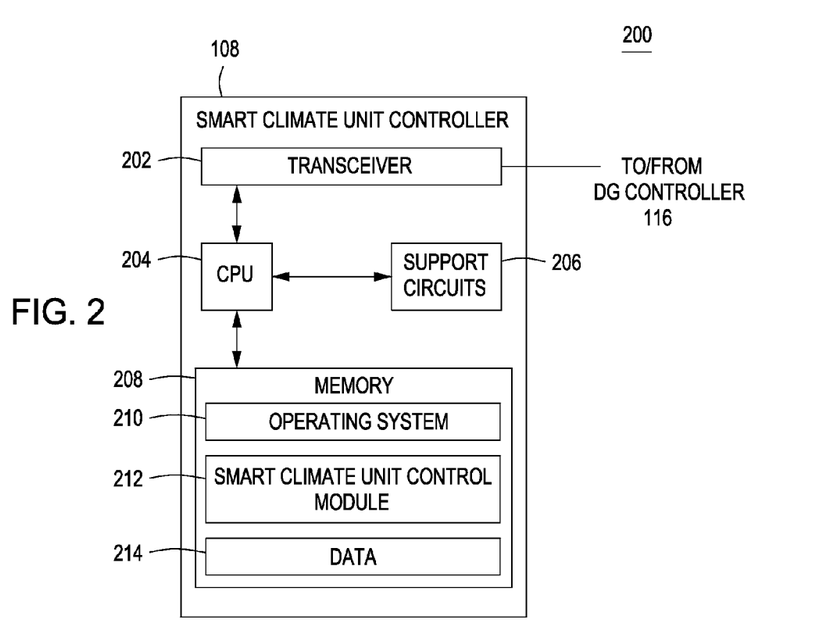
FIG. 2 is a block diagram of a smart climate unit controller in accordance with one or more embodiments of the present invention.

FIG. 2 is a block diagram of a smart climate unit controller 108 in accordance with one or more embodiments of the present invention. The smart climate unit controller 108 comprises a transceiver 202 communicatively coupled to the DG controller 116. The transceiver 202 may utilize wireless (e.g., based on standards such as IEEE 802.11, Zigbee, Z-wave, or the like) and/or wired communication techniques for such communication.

The transceiver 202 is further coupled to at least one central processing unit (CPU) 204, and the CPU 204 is additionally coupled to support circuits 206 and a memory 208. The CPU 204 may comprise one or more conventionally available microprocessors. Alternatively, the CPU 204 may include one or more application specific integrated circuits (ASIC). The support circuits 206 are well known circuits used to promote functionality of the CPU 204. Such circuits include, but are not limited to, a cache, power supplies, clock circuits, buses, network cards, input/output (I/O) circuits, and the like.

The memory 208 may comprise random access memory, read only memory, removable disk memory, flash memory, and various combinations of these types of memory. The memory 208 is sometimes referred to as main memory and may, in part, be used as cache memory or buffer memory. The memory 208 generally stores an operating system (OS) 210 of the smart climate unit controller 108. The OS 210 may be one of a number of available operating systems for microcontrollers and/or microprocessors. In some embodiments where the smart climate unit 104 comprises a commercially available thermostat device, the OS 210 may be a default OS of the thermostat device.

The memory 208 may store various forms of application software, such as a smart climate unit control module 212 for operatively controlling the smart climate unit 104 as previously described with respect to FIG. 1. Additionally, the memory 208 may store data 214 related to the operation of the smart climate unit 104. Such data may include climate control profiles for operating the climate control system 110 (e.g., profiles that are time-based, user location-based, user preference-based, or energy mode-based); archived statistics and/or reports for climate control data, energy consumption/production data, and/or weather related data; learned climate control behaviors (e.g., timeframes for temperature and/or humidity adjustments or the like); and/or any other data related to the operation of the smart climate unit 104. Additionally, the data 214 may include data pertaining to the operation of the DG 118, for example, for use in demand management control of the climate control system 110.

Figure 3:
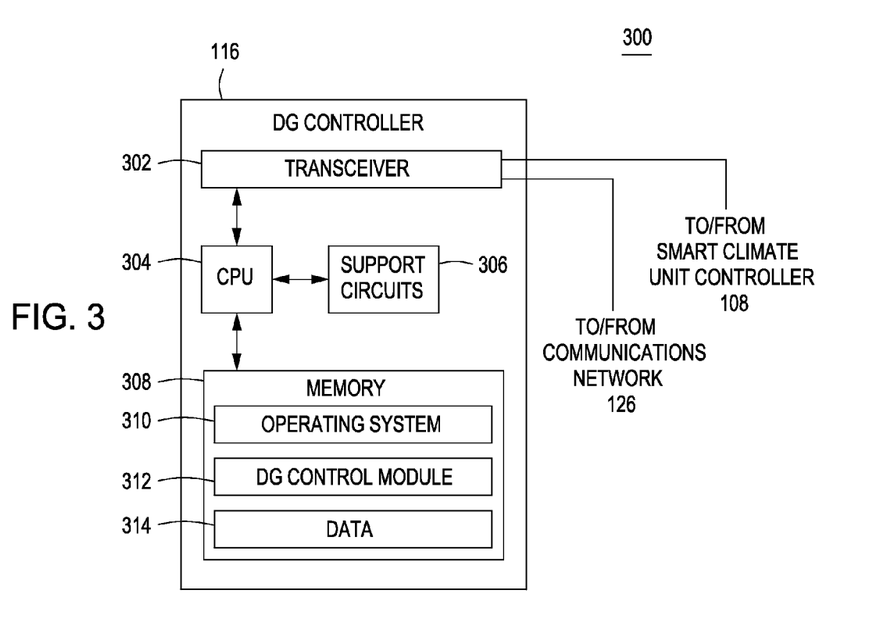
FIG. 3 is a block diagram of a distributed generator (DG) controller in accordance with one or more embodiments of the present invention.

FIG. 3 is a block diagram of a DG controller 116 in accordance with one or more embodiments of the present invention. The DG controller 116 comprises a transceiver 302 communicatively coupled to the smart climate unit controller 108 as well as the communications network 126. The transceiver 302 may utilize wireless (e.g., based on standards such as IEEE 802.11, Zigbee, Z-wave, or the like) and/or wired communication techniques for such communication; in some embodiments, the DG controller 116 may be coupled to the communications network 126 via a commercially available router.

The transceiver 302 is further coupled to at least one central processing unit (CPU) 304, and the CPU 304 is additionally coupled to support circuits 306 and a memory 308. The CPU 304 may comprise one or more conventionally available microprocessors. Alternatively, the CPU 304 may include one or more application specific integrated circuits (ASIC). The support circuits 306 are well known circuits used to promote functionality of the CPU 304. Such circuits include, but are not limited to, a cache, power supplies, clock circuits, buses, network cards, input/output (I/O) circuits, and the like.

The memory 308 may comprise random access memory, read only memory, removable disk memory, flash memory, and various combinations of these types of memory. The memory 308 is sometimes referred to as main memory and may, in part, be used as cache memory or buffer memory. The memory 308 generally stores an operating system (OS) 310 of the DG controller 116. The OS 310 may be one of a number of available operating systems for microcontrollers and/or microprocessors, such as, but not limited to, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The memory 308 may store various forms of application software, such as a DG control module 312 for operatively controlling the DG 118 (i.e., via the inverter 122). Additionally, the memory 308 may store data 314 related to the operation of the DG 118, such as power production data or the like. The DG controller 116 may provide at least a portion of the data 314 to the smart climate unit controller 108 for use in operating the climate control system 110 as previously described.

The master controller 128 (not shown) is a type of controller, analogous to the DG controller 116, which may contain additional elements, such as application software for managing a plurality of DGs 118 as well as application software for managing the website 130.

Figure 4:
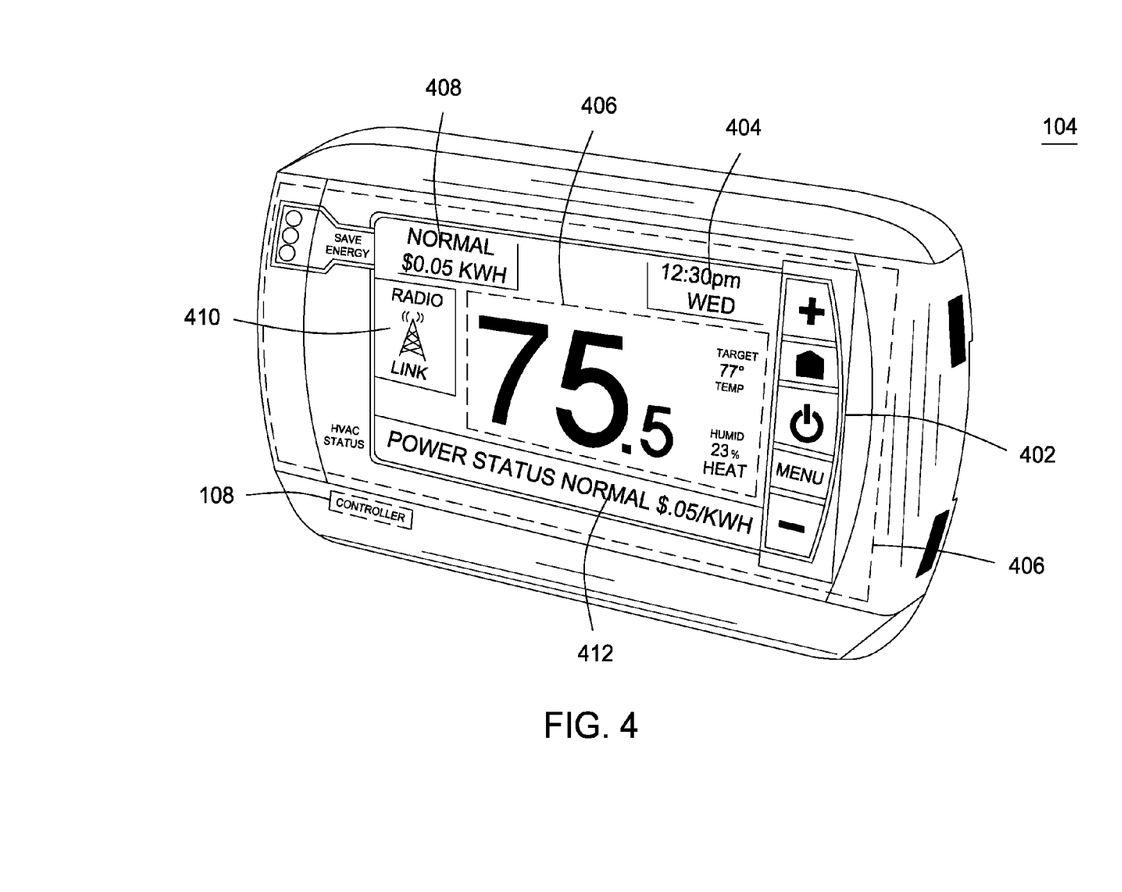
FIG. 4 is a depiction of a smart climate unit in accordance with one or more embodiments of the present invention.

FIG. 4 is a depiction of a smart climate unit 104 in accordance with one or more embodiments of the present invention. The display interface 106 of the smart climate unit 104 comprises user controls 402 for adjusting settings of the smart climate unit 104. The user controls 402 may include buttons, knobs, touch screen features, or the like, for obtaining menus for operating the smart climate unit 104, displaying climate control related information (e.g., TOU rates, external weather conditions, energy consumption, or the like), increasing or decreasing current temperature and/or humidity levels, creating climate control profiles, viewing/changing saved information (such as any of the data 214), and controlling other features of the smart climate unit 104.

The display interface 106 additionally comprises a date/time display 404 for displaying the current date and/or time; a climate status display 406 for displaying information related to the current climate of the building 102 as well as current settings, such as current temperature and/or humidity, target temperature and/or humidity, current operating mode (e.g., heat, air conditioning), or the like.

The display interface 106 further comprises an energy mode display 408 for displaying information related to the current energy mode (e.g., current mode is normal or energy saver, current cost per kilowatt hour, or the like); a communications status indicator 410 for displaying the current status of the communications link, for example, to the DG controller 116; and an energy usage display 412 for displaying information pertaining to current energy consumption (e.g., power status is low/normal/high, cost per kilowatt hour, or the like). The display interface 106 may further comprise additional controls for operating the smart climate unit 104 and/or additional displays for presenting information related to the smart climate unit 104 as previously described.

Figure 5:
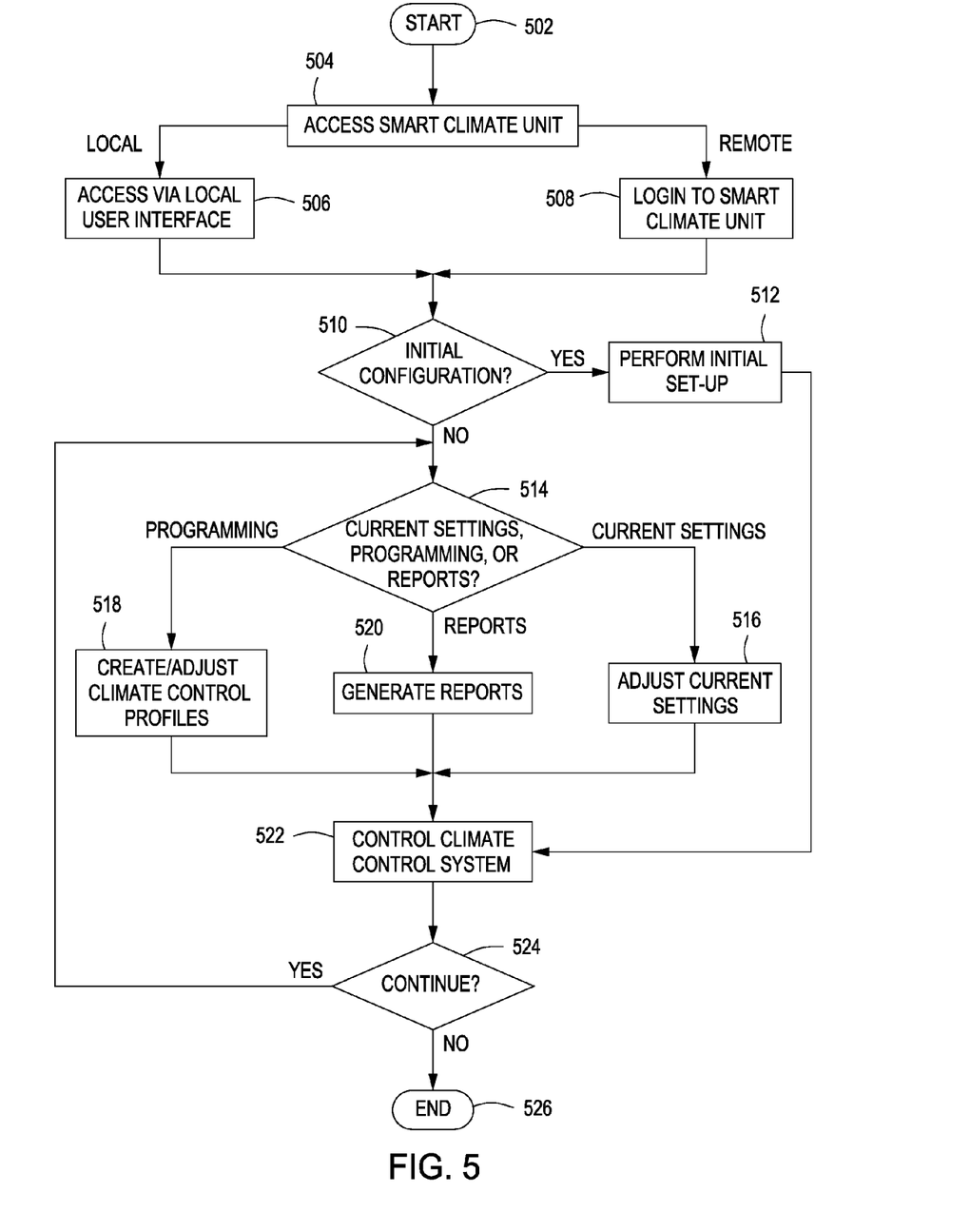
FIG. 5 is a block diagram of a method for smart climate control in accordance with one or more embodiments of the present invention.

FIG. 5 is a block diagram of a method 500 for smart climate control in accordance with one or more embodiments of the present invention. In some embodiments, such as the embodiments described below, a smart climate unit is located within a commercial or residential building for locally and/or remotely operating a climate control system (e.g., to control temperature, humidity, heat pump activity, or the like) of the building (e.g., the smart climate unit 104 within the building 102 for driving the climate control system 110). The smart climate unit may further be coupled to a DG controller for receiving information pertaining to the operation of a DG that supplies power to the building, and the smart climate unit may utilize such information when operating the climate control system. Additionally, the DG controller may be coupled to a master controller, a remote user, or the like, via a communications network such as the Internet.

The method 500 begins at step 502 and proceeds to step 504, where a user desires to access the smart climate unit. If the user is within the building, the user may locally access the smart climate unit and the method 500 proceeds to step 506; alternatively, if the user is remotely located, the user may remotely access the smart climate unit and the method 500 proceeds to step 508. At step 506, the user may locally access the smart climate unit via a user interface of the smart climate unit, such as a touch screen display, buttons, knobs, or the like. Additionally or alternatively, the smart climate unit may be coupled to a separate display and/or input/output device, such as a personal computer, a personal digital assistant, or the like, for presenting a user interface to the user.

At step 508, the remotely located user may log in to the smart climate unit via a conventional web browser, for example as previously described with respect to FIG. 1. The user may log in to the smart climate unit utilizing any suitable device that supports the web browser, such as a smart cell phone, a personal computer, a personal digital assistant, or the like. In some embodiments, the user may log in to the smart climate unit via a password protected portal.

Once the user has accessed the smart climate unit locally at step 506 or remotely at step 508, the method 500 proceeds to step 510. At step 510, a determination is made whether the user is performing an initial configuration of the smart climate unit. If the result of the determination at step 510 is yes, the method 500 proceeds to step 512 where the user performs the initial configuration. As part of the initial configuration, the user may manually set climate-related parameters to adjust current conditions (e.g., desired temperature, humidity) as well as generate one or more climate control profiles which may be stored within the smart climate unit for automatically operating the smart climate unit. Such profiles may specify climate control settings (e.g., preferred temperature, humidity, heat pump settings, and the like) based on criteria such as date/time, energy mode, user preference, user location, weather conditions, and the like. For example, time-based profiles may specify settings based on time of day, day of week, month of year, groupings of certain hours and/or days (e.g., waking/sleeping time, working from home, petsitting, vacation periods, holidays), and the like. Energy mode-based profiles may specify settings that are based on criteria related to energy usage, such as energy saver mode, TOU rates, current energy consumption, supply conditions (e.g., energy production by a DG providing power to the building), peak energy consumption times, and the like. User preference-based profiles may specify preferred settings for one or more users. Location-based profiles may specify settings based on proximity of one or more users and/or current travel speed of the one or more users. Weather-based profiles may specify settings that are based on current and/or predicted weather conditions.

The smart climate unit may provide a "wizard" functionality for assisting the user during the initial configuration as well as during subsequent operation. Once the initial configuration of the smart climate unit is completed, the method 500 proceeds to step 522. If, at step 510, the result of the determination is no, the method 500 proceeds to step 514. At step 514, the user may decide to change current settings of the smart climate unit and the method 500 proceeds to step 516; program the smart climate unit and the method 500 proceeds to step 518; or generate/access reports from the smart climate unit and the method 500 proceeds to step 520. The smart climate unit wizard may assist the user at any of the steps 516, 518, or 520.

At step 516, the user may adjust any of the current settings of the smart climate unit, such as temperature, humidity level, heat pump operation, energy mode, or the like; additionally, the user may activate/terminate any of the climate control profiles. The method 500 then proceeds to step 522.

At step 518, the user may create new or modify existing climate control profiles. The method 500 then proceeds to step 522.

At step 520, the user may generate current data and/or reports, as well as access archived data and/or reports, related to the operation of the smart climate unit. Such data and/or reports may be presented as pie charts, bar charts, spreadsheets, or the like, and may include information pertaining to climate control statistics during pre-defined or user-defined periods (e.g., total hours cooling, total hours heating, or the like); energy related statistics (e.g., energy saver mode hours, energy consumption for cooling, energy consumption for heating, or the like); current and/or predicted weather conditions; learned climate control behaviors (e.g., timeframes for temperature and/or humidity adjustments or the like); and/or any other data related to the operation of the smart climate unit. Additionally, the user may obtain data and/or reports pertaining to the operation of a distributed generator (DG) that provides power for the building, for example, as related to the operation of the smart climate unit.

The user may save generated data and/or reports within the smart climate unit; in some embodiments, the smart climate unit may be locally coupled to a separate storage device for storing data and/or reports and/or a printer for printing desired data and/or reports. The method 500 then proceeds to step 522.

At step 522, the smart climate unit controls the building's climate control system based upon the user's settings (i.e., manual settings and/or climate control profiles). In some embodiments, the smart climate unit may additionally regulate energy consumption utilizing demand management. For example, based upon supply conditions, such as energy production by a DG coupled to the building, peak energy consumption times, TOU rates, or the like, the smart climate unit may optimally control the climate control system for achieving a desired level of energy consumption (e.g., optimizing energy consumption versus cost). Further, the smart climate unit may additionally or alternatively control the building's climate control system based on externally generated requests to regulate energy consumption. For example, the smart climate unit may receive a request from an electric company (e.g., communicated via the powerline or the communications network) to regulate energy consumption in order to assist with peak load balancing; the smart climate unit may then control the climate control system accordingly. At step 524, a determination is made whether to continue. If the result of such determination is yes, the method 500 returns to step 514; if the result of such determination is no, the method 500 proceeds to step 526 where it ends.

Figure 6:
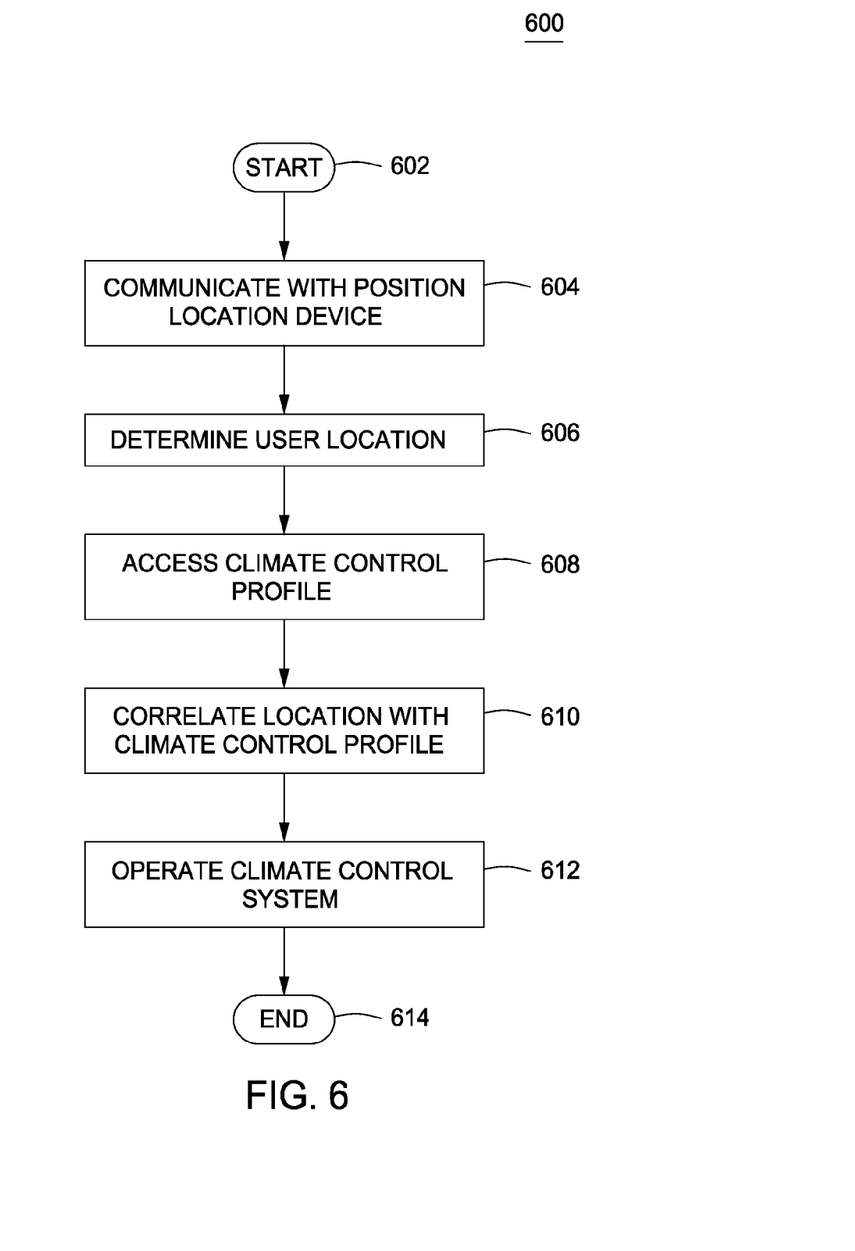
FIG. 6 is a block diagram of a method for location-based climate control in accordance with one or more embodiments of the present invention.

FIG. 6 is a block diagram of a method 600 for location-based climate control in accordance with one or more embodiments of the present invention. In some embodiments, such as the embodiment described below, a smart climate unit (e.g., the smart climate unit 104) is located within a residential or commercial building for operating the climate control system (e.g., to control temperature, humidity, heat pump activity, or the like) of the building. The smart climate unit contains one or more location-based climate control profiles (e.g., the climate control profiles previously described) for automatically operating the smart climate unit based on pre-set preferences of one or more users who access the building. The smart climate unit may further be coupled to a DG controller for receiving information pertaining to the operation of a DG that supplies power to the building, and the smart climate unit may utilize such information when operating the climate control system The method 600 starts at step 602 and proceeds to step 604. At step 604, the smart climate unit communicates with one or more position location devices for determining locations of each applicable user. A position location device may be any device for locating people and/or assets, e.g., a cell phone, a global positioning system (GPS), a personal digital assistant, ON-STAR service, or the like. The smart climate unit obtains information from the position location device or devices, such as longitude and latitude coordinates, for determining the location of the one or more users.

The method 600 proceeds to step 606, where the smart climate unit determines a current location for each applicable user based on the position information obtained from the position location device or devices. For example, a user's cell phone number may be entered as part of their location-based climate control profile. The smart climate unit may then obtain position information that identifies a current position of the user's cell phone, for example, based on a global positioning satellite (GPS) receiver of the cell phone, cell-triangulation features of the cell phone, or the like. The smart climate unit utilizes the positioning information to determine a current location of the cell phone as a proxy for the user's location.

The smart climate unit may determine the user's location as an absolute position, e.g., a position based on longitude and latitude, other types of absolute coordinates, landmarks, or the like. Additionally or alternatively, the user's position may be determined as a relative position; for example, the user's distance from the building may be determined based on existing site information, such as an address of the building stored within the smart climate unit. As part of determining the user's current location, the smart climate unit may access databased information, such as addresses, information pertaining to landmarks, coordinates, or the like.

The smart climate unit may additionally determine a travel speed of the user; for example, the smart climate unit may obtain the travel speed from the position location device, compute the travel speed based on position information obtained from the position location device, or determine the travel speed by other techniques.

The method 600 proceeds to step 608. At step 608, location-based climate control profiles corresponding to the applicable users are accessed. The location-based climate control profiles may be stored within the smart climate unit and/or external to the unit, and comprise desired climate settings (e.g., temperature, humidity, and/or heat pump control) for the users along with rules for operating the climate control system based on the locations of the users. For example, a first user's climate control profile may specify a preferred temperature and humidity setting, and may specify that the climate control system be activated to generate the desired temperature and humidity when the first user is within a certain number of miles of the building.

The method 600 proceeds to step 610, where the smart climate unit correlates the accessed location-based climate control profile information with the current user locations for determining suitable operative control of the climate control system. In some embodiments, the smart climate unit may "learn" timeframes required to reach certain temperature and/or humidity levels within the building, for example, based on external and/or predicted weather conditions, and factor in such learned information when operating the climate control system. At step 612 the smart climate unit operates the climate control system accordingly to adjust the building's climate based on the user locations. The smart climate unit may continually coordinate information (e.g., location data, user travel speed data, location-based climate control profile date) for a plurality of users at a plurality of different locations to optimally control the climate control system based on each user's location and preferences.

The method 600 then proceeds to step 614 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for controlling climate within a building, comprising:
   a smart climate unit for: (i) obtaining distributed generator (DG) information, via a communications network, pertaining to operation of a DG that generates power for the building, and (ii) controlling at least one climate condition within the building based on at least one of the DG information, local input, or remote input.

2. The apparatus of claim 1, wherein the smart climate unit controls the at least one climate condition based on a climate control profile.

3. The apparatus of claim 2, wherein the climate control profile specifies at least one climate control setting based on at least one of time, energy mode, user preference, user location, or weather information.

4. The apparatus of claim 1, wherein the smart climate unit controls the at least one climate condition based on a location of a user.

5. The apparatus of claim 4, wherein the smart climate unit controls the at least one climate condition based on a travel speed of the user.

6. The apparatus of claim 4, wherein the smart climate unit determines the location of the user based on a position location device.

7. The apparatus of claim 1, wherein the smart climate unit controls the at least one climate condition using demand management.

8. The apparatus of claim 1, wherein the smart climate unit learns climate control information over time and uses the learned climate control information for controlling the at least one climate condition.

9. A method for controlling climate within a building, comprising:
   receiving distributed generator (DG) information pertaining to the operation of a DG that couples power to the building;
   determining at least one setting for controlling at least one climate condition within the building based on at least one of the DG information, local input, or remote input; and
   operating a climate control system of the building based on the at least one setting.

10. The method of claim 9, wherein the at least one setting is determined based on a climate control profile.

11. The method of claim 10, wherein the climate control profile specifies the at least one setting based on at least one of time, energy mode, user preference, user location, or weather information.

12. The method of claim 9, further comprising determining a location of a user, wherein the at least one setting is determined based on the location.

13. The method of claim 12, further comprising determining a travel speed of the user, wherein the at least one setting is further determined based on the travel speed.

14. The method of claim 12, further comprising receiving position information corresponding to a position location device, wherein the location is determined based on the position information.

15. The method of claim 9, wherein the at least one setting is determined based on demand management.

16. The method of claim 9, further comprising learning climate control information over time, wherein the at least one setting is determined based on the learned climate control information.

17. A system for controlling climate within a building, comprising:
   a smart climate unit for controlling at least one climate condition within the building; and
   a distributed generator (DG), coupled to the smart climate unit, for coupling generated power to the building, wherein the smart climate unit obtains DG information pertaining to operation of the DG and controls at least one climate condition within the building based on at least one of the DG information, local input, or remote input.

18. The system of claim 17, wherein the smart climate unit controls the at least one climate condition based on a climate control profile and the climate control profile specifies at least one climate control setting based on at least one of time, energy mode, user preference, user location, or weather information.

19. The system of claim 17, wherein the smart climate unit controls the at least one climate condition based on a location of a user.

20. The system of claim 17, wherein the smart climate unit controls the at least one climate condition using demand management.

* * * * *